(12) United States Patent
Jasnie

(10) Patent No.: US 7,905,153 B2
(45) Date of Patent: Mar. 15, 2011

(54) FLOW VORTEX SUPPRESSION APPARATUS FOR A MASS AIR FLOW SENSOR

(75) Inventor: Jasris Jasnie, Kalamazoo, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/429,596

(22) Filed: Apr. 24, 2009

(65) Prior Publication Data

US 2010/0269583 A1 Oct. 28, 2010

(51) Int. Cl.
*G01F 1/32* (2006.01)
(52) U.S. Cl. ...................................... 73/861.24
(58) Field of Classification Search ............ 73/861.24, 73/861.52, 202.5, 861.69
See application file for complete search history.

(56) References Cited

U.S. PATENT DOCUMENTS

| | | | |
|---|---|---|---|
| 4,397,192 A * | 8/1983 | Mollet | 73/861.22 |
| 4,433,576 A | 2/1984 | Shih et al. | |
| 4,455,877 A | 6/1984 | Blechinger et al. | |
| 5,109,703 A * | 5/1992 | Tanimura et al. | 73/861.22 |
| 5,163,322 A | 11/1992 | Ohtani | |
| 5,303,584 A * | 4/1994 | Ogasawara et al. | 73/204.21 |
| 5,483,829 A | 1/1996 | Caron | |
| 5,685,887 A | 11/1997 | Mochida | |
| 5,922,970 A * | 7/1999 | Ohle | 73/861.22 |
| 6,199,434 B1 * | 3/2001 | Cornil et al. | 73/861.83 |
| 6,401,531 B1 * | 6/2002 | Tank et al. | 73/204.21 |
| 6,598,462 B2 | 7/2003 | Williams | |
| 6,645,274 B2 * | 11/2003 | Rilling et al. | 95/267 |
| 6,647,775 B1 * | 11/2003 | Hecht et al. | 73/202.5 |
| 6,655,207 B1 * | 12/2003 | Speldrich et al. | 73/202.5 |
| 7,302,862 B2 * | 12/2007 | Fujiwara et al. | 73/861.52 |
| 7,600,436 B2 * | 10/2009 | Hoecker | 73/861.22 |

FOREIGN PATENT DOCUMENTS

EP 1982754 10/2008
WO WO91/12496 8/1991

OTHER PUBLICATIONS

PCT Search report PCT/EP2010/054883.

* cited by examiner

*Primary Examiner* — Jewel Thompson
(74) *Attorney, Agent, or Firm* — James R. Hasselbeck

(57) ABSTRACT

In various aspects of the invention a flow vortex suppression apparatus for use in an air intake duct having a mass air flow sensor is disclosed. The flow vortex suppression apparatus includes an air flow permeable fibrous vortex dispersive media installed into the air duct in a position upstream of the mass flow sensor and configured to occlude the air duct such that air flow in the duct is constrained to pass through the vortex dispersive media. The vortex dispersive media is configured and adapted to diffuse vortices and reduce air turbulence of an air stream entering the mass flow sensor, thereby reducing variations and noise in a flow measurement signal from the mass air flow sensor.

16 Claims, 8 Drawing Sheets

FLOW VORTEX SUPPRESSION APPARATUS FOR A MASS AIR FLOW SENSOR

TECHNICAL FIELD

This disclosure relates to mass air flow measurement in an engine air intake tract and apparatus to improve mass air flow sensor performance by reducing turbulence and vortices in the air flow.

BACKGROUND OF THE INVENTION

Mass air flow sensors are typically applied to measure the amount of air entering the air intake tract of an internal combustion engine. So as to reduce pollution and to provide a cleaner and more complete fuel combustion, the mass air flow sensor signal is provided to a specialized computing device (sometimes called an engine control unit or ECU) that utilizes the air flow signal, among other measured signals, to calculate and regulate the proper amount of fuel to deliver to the engine for efficient combustion.

It is known that air density varies with temperature and pressure (often affected by the altitude at which the vehicle engine operates). The mass air flow sensor is applied to measure the mass flow of air in the intake tract to the engine under a variety of operating conditions.

Various types of mass air flow sensors are known. One type provides a vane or paddle projecting into the intake air stream and supported on a spring-loaded arm. The vane moves in proportion to the airflow and this displacement is calibrated and utilized to generate a mass flow signal.

Another type in wide use is the hot wire mass air flow sensor. This sensor has an electrically heated wire suspended in a portion of the engine intake air stream. The resistance of the wire varies with temperature, and wire temperature varies with the air flow over the wire. As air flow increases, the wire resistance decreases (decreasing wire temperature due to conduction cooling effect of the air) and therefore more current must be supplied by the sensor electronics to restore the wire temperature. In such a system, variations in the electric current supplied to heat the hot wire sensor are related to changes in air flow.

Other types of mass air flow sensors are known, however, these few are sufficient introductory examples for our discussions herein.

Mass air flow sensors are calibrated to have an output signal indicative of the quantity of air flowing in the air intake tract. This mass air flow calibration can be affected in undesired ways by the presence of vortices that may be present in the air flow stream. Vortices are a characteristic of turbulent fluid flow (herein we include air and other gases as fluids). A vortex is a spinning, often turbulent flow of fluid, swirling around a center. The fluid velocities in these vortices can be detected by the mass air flow sensor and contribute to measurement errors in the intake air flow with the result that the mass air flow sensor becomes a less reliable indicator of the quantity of air flow into the engine.

It is typical practice to install the mass air flow sensor after (downstream of) the air filter into the air intake tract between the air filter and the engine. Installation after the air filter is advantageous as the air filter removes contaminants from the air stream before they can build up upon and affect the calibration of the mass air flow sensor. The geometry of the air filter may contribute to the generation of shear layers in the air flow at the outlet side of the air filter, which may result in the generation of vortices in the air stream entering the mass air flow sensor and the resultant reduction in mass air flow sensor signal quality.

It is known within the prior art to install straightening vanes or flow aligned tubular honeycomb structures to reduce turbulence in the air intake tract. While such solutions are serviceable, they are disadvantageous from a total system cost point of view. Therefore a lower cost and more easily implemented solution is desirable.

SUMMARY OF THE INVENTION

In aspects of the invention a flow vortex suppression apparatus for use in an air intake duct having a mass air flow sensor is disclosed. The flow vortex suppression apparatus includes an air flow permeable fibrous vortex dispersive media installed into the air duct in a position upstream of the mass flow sensor and configured to occlude the air duct such that air flow in the duct is constrained to pass through the vortex dispersive media. The vortex dispersive media is configured and adapted to diffuse vortices and reduce air turbulence of an air stream entering the mass flow sensor, thereby reducing variations and noise in a flow measurement signal from the mass air flow sensor.

In another aspect of the invention the flow vortex suppression apparatus includes a supportive cage housing configured to receive and contain the vortex dispersive media therein.

In another aspect of the invention the cage housing is configured to removeably install into an air cleaner housing and positioned to receive air flow from a clean air face of an air filter element.

In another aspect of the invention the cage housing inlet face has substantially the same dimensions as the clean air face and the cage housing is installable into the air cleaner in a position proximate to, or in other embodiments directly contacting the clean air face.

In another aspect of the invention the fibrous vortex dispersive media includes a non-woven fleece of spun or melt blown natural and/or synthetic fibers of materials such as any of: nylon, polypropylene, glass fibers and synthetic resin microfibers, among others.

In another aspect of the invention the fibrous vortex dispersive media is operable to entrap at least a portion of particulate contaminants present in the air flow in the air intake tract thereby further protecting the mass air flow sensor.

In another aspect of the invention the vortex suppression apparatus is additionally operable to dampen noise levels transmitted through the air intake duct, reducing apparent engine noise.

In another aspect of the invention the flow vortex suppression apparatus further includes a supporting member such as wire mesh or plastic mesh configured to provide support to the air flow permeable fibrous vortex dispersive media against air flow induced forces.

In another aspect of the invention a flow vortex suppression apparatus is provided for the engine air intake mass air flow sensor housing. The air flow permeable fibrous vortex dispersive media is provided at an air inlet side of the housing. The flow vortex suppression apparatus is configured to constrain the air flow in the mass air flow sensor housing to pass through the fibrous vortex dispersive media before reaching the air flow sensor such that the vortex dispersive media is configured to diffuse vortices and reduce air flow turbulence entering the mass flow sensor and reduce variations and noise in a flow signal from the sensor.

In another aspect of the invention a flow vortex suppression element is integrated with an air filter and includes an air flow permeable fibrous vortex dispersive media positioned at the outlet face of the air filter and configured to fully cover the outlet face such that air flow through the air filter must pass through the vortex dispersive media such that the vortex dispersive media is operative to reduce turbulence and diffuse vortices of the air flow passing therethrough.

In another aspect of the invention the vortex dispersive media is adhesively secured to the outlet face of the air filter.

In another aspect of the invention the vortex dispersive media is retentively captured against the outlet face of the air filter by a frame member secured to a filter seal ring.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
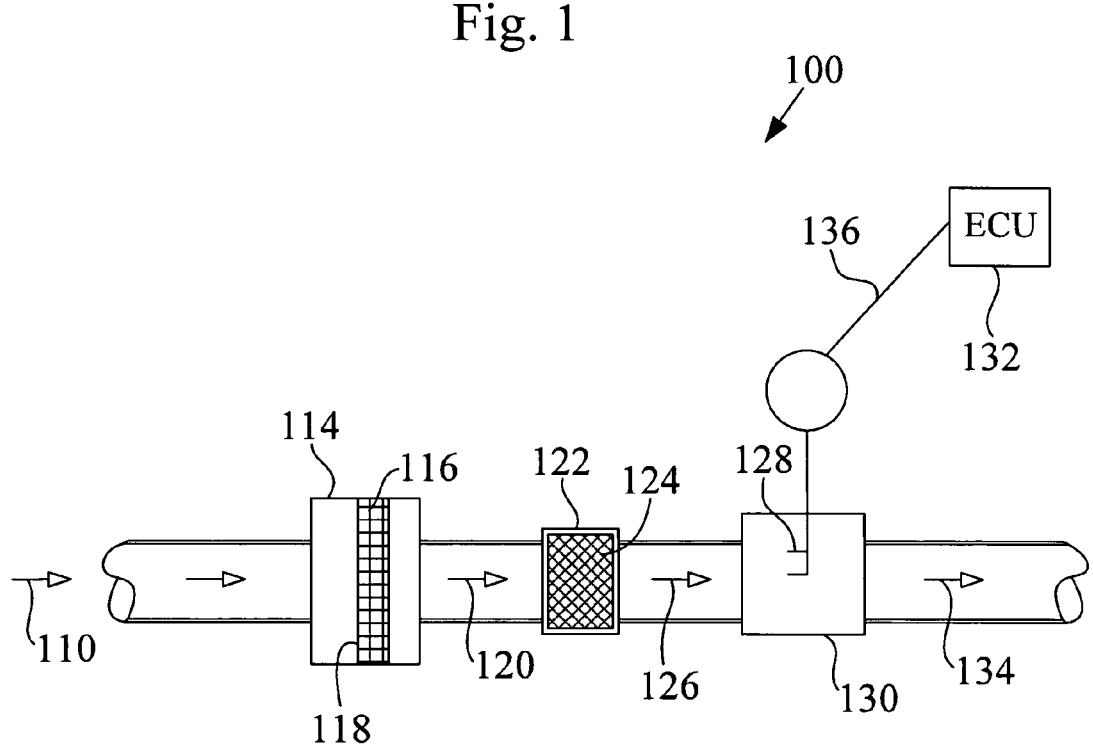
FIG. 1 is a schematic illustration of a portion of an air intake tract including an air filter, mass air flow sensor and an interposed flow vortex suppression apparatus, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an apparatus and method of improving the measurement signal (performance) of a mass air flow sensor by diffusion of vortices and reduction of flow turbulence using the flow vortex suppression apparatus as disclosed herein. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a schematic illustration of a portion of an air intake tract including an air filter, mass air flow sensor and an interposed flow vortex suppression apparatus, arranged consistently with various aspects of the present invention as presented herein.

In FIG. 1, air flow (arrow 110) enters an air intake tract 100 and into an air cleaner 114 where it is filtered by air filter 116 to remove particulate contaminants. Air flows from the downstream face 118 of the air filter 116 in what may be a turbulent state (as will be discussed later). The turbulent, possibly flow vortex carrying air stream continues (as shown by arrow 120) to the flow vortex suppression apparatus 122 configured according to any of the aspects of the present invention disclosed herein. After passage through the flow vortex suppression apparatus 122, the air flow exits the outlet face 124 of the flow vortex suppression apparatus 122 in a state of significantly reduced flow turbulence with turbulent jets and flow vortices substantially eliminated (as will be discussed later below), and continues (see arrow 126) to flow in the air intake tract 100 to the mass air flow sensor 128, which may or may not include a separate mass air flow sensor housing 130. The elimination of turbulent jets and vortices in the air flow (due to the presence of the flow vortex suppression apparatus 122) leads to lower signal variation (relative to actual flow) and in some cases lower signal noise at the mass air flow sensor 128, thereby reducing air flow measurement errors. The mass air flow signal 136 is one signal provided to and considered by computer processor based engine control unit (ECU) 132 which has many tasks including maintaining a desired ratio of fuel to air delivered to an engine (not shown). Air exits the mass air flow sensor 128 and proceeds (arrow 134) towards the engine (not shown), possibly first passing through a throttle body (also not shown). Advantageously, the flow vortex suppression apparatus 122 also contributes to dampening of engine noise levels transmitted through the air intake tract or duct 100, thereby reducing apparent engine operating noise.

Figure 2A:
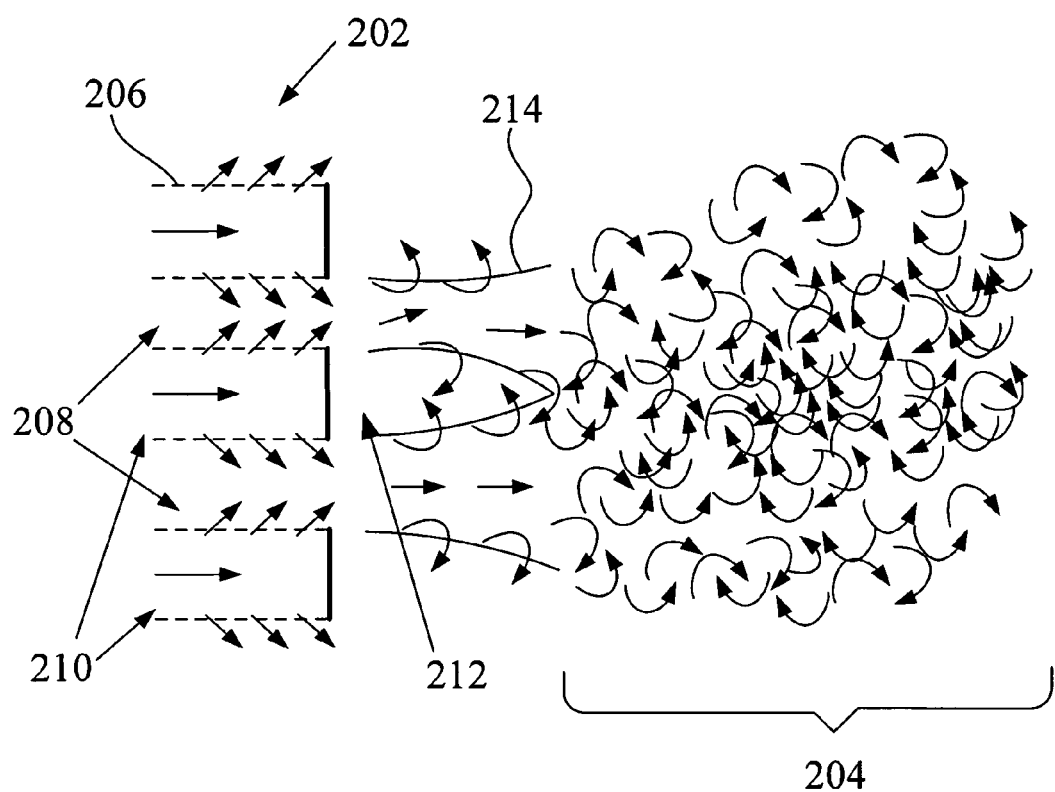
FIG. 2A is a schematic representation of air flow through a filter element and the turbulent jet resulting from shear layers present at the outlet side of the filter element.

For understanding of the concepts of the present invention, FIG. 2A presents a schematic and conceptualized representation of air flow (shown by arrows) through a filter element 202 and the turbulent air jet 204 resulting from air flow through the filter element 202. Filter element 202 includes a porous filter media 206 which may include a plurality of filter exit channels 208 and a plurality of filter inlet channels 210. In the type of filter illustrated schematically in FIG. 2A, the filter is of the axial flow variety having a plurality of axially aligned channels closed alternately at opposing sides of the filter. In FIG. 2A air enters the filter through inlet channels 210, flows through the porous filter media 206 and then exits the filter through the exit channels 208. The closed ends of inlet channels 210 result in flow stagnant regions 212, or areas of low flow velocity located along side regions of substantially higher flow velocity (air leaving exit channels 208). At a boundary 214 between the low velocity air and the high velocity air folding vortices may form as the higher velocity air flow flows alongside or over the lower velocity air flow, potentially creating folding vortices at the boundary or shear layer 214 and possibly resulting in a turbulent air jet 204.

Figure 2B:
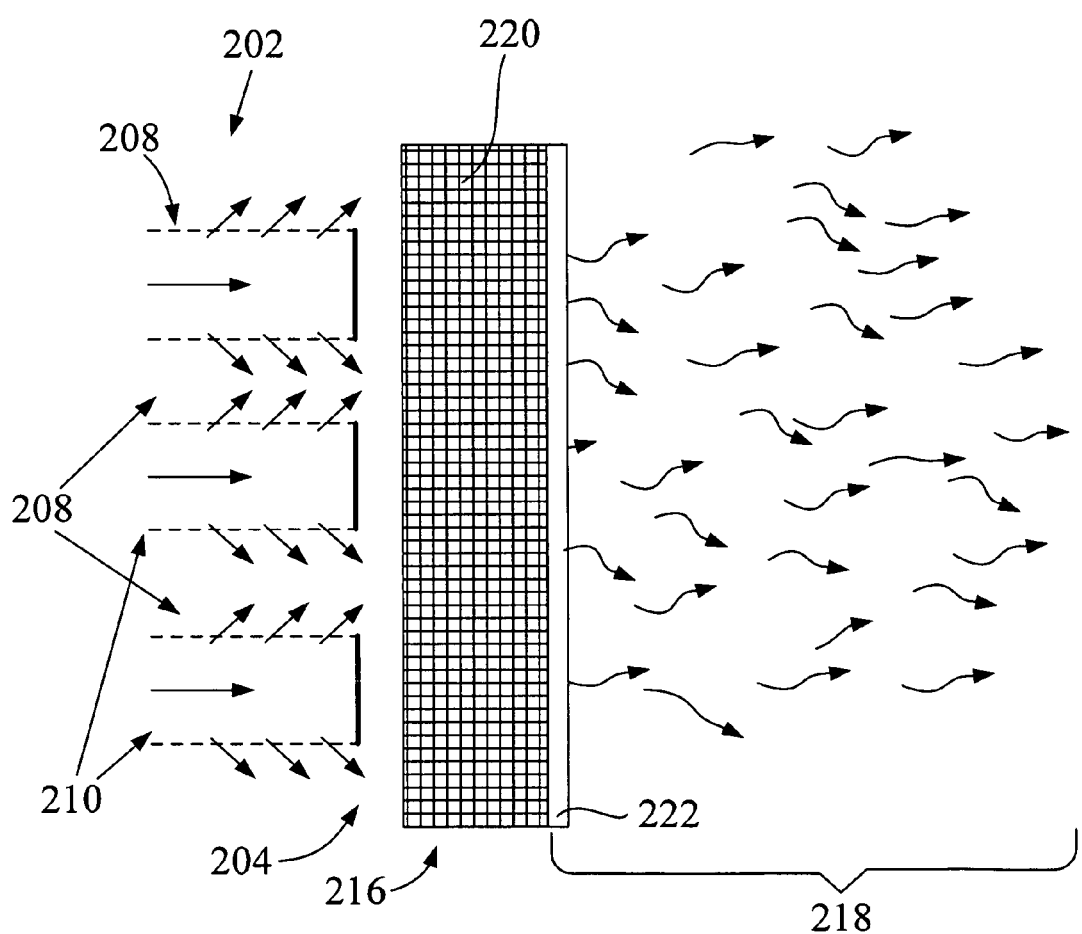
FIG. 2B presents as schematic representation of air flow through a filter element in which a vortex suppression apparatus is installed downstream of the filter, diffusing vortices in the air flow and reducing turbulence intensity, consistent with the present invention.

As a solution to this problem, FIG. 2B presents a schematic and conceptualized representation of air flow (shown by arrows) through the filter element 202 as discussed with FIG. 2A. In this case however, a flow vortex suppression apparatus 216 is now provided downstream of the air filter element 202. The flow vortex suppression apparatus 216 includes an air flow permeable flow vortex dispersive media 220 operative to diffuse air flow after the filter element 202, eliminating the turbulent jet 204 and providing an air stream 218 having reduced turbulence intensity and a more uniform flow velocity profile. These characteristics advantageously result in a lower signal variation from a downstream mass air flow sensor, as discussed earlier with FIG. 1.

In various aspects of the invention disclosed herein, the air flow permeable flow vortex dispersive media (for example media 218 of FIG. 2B), may be realized by a non-woven fleece comprising spun or melt blown natural and/or synthetic fibers of materials including varieties of nylon, polypropylene, glass fibers and synthetic resin microfibers, among other suitable materials as known to those skilled in the art. The use of fleece to diffuse flow vortices provides a solution that is effective, easily adapted to new applications and very cost favorable compared to honeycomb structures and straightening vanes of the prior art.

In various aspects of the invention disclosed herein, an optional supporting layer or member (for example 222 on FIG. 2B) may be provided, for example a wire or plastic mesh component configured to provide support to the fleece against air flow induced forces induced on the fleece material.

It should be understood to one skilled in the art that compromised mass air flow measurements from air flow turbulent jet and vortex issues are not limited to axial air filters discussed with FIGS. 2A and 2B. Other types of air filters will exhibit and generate turbulent air flow at the outlet face, for example pleated air filters (a very commonly used type) have a filter media outlet face that is formed as a series of "v" shaped folds. The folds tend to concentrate air flow at the filter outlet face in the concave areas of the folds, resulting in higher flow velocities in this region. Similarly, at the outlet face the convex portions of the folds emit comparatively little air flow, resulting in lower flow velocities in these regions. These regions are positioned side by side, as in FIG. 2A above, and may result in turbulent jets and undesired turbulence intensity in the air flow, similar to the discussions above with FIG. 2A label 204.

Therefore, the present invention is advantageously applicable to eliminate turbulent jets and reduce the turbulence of air streams downstream from many types of air filters, resulting in improved mass air flow sensor performance.

Figure 3:
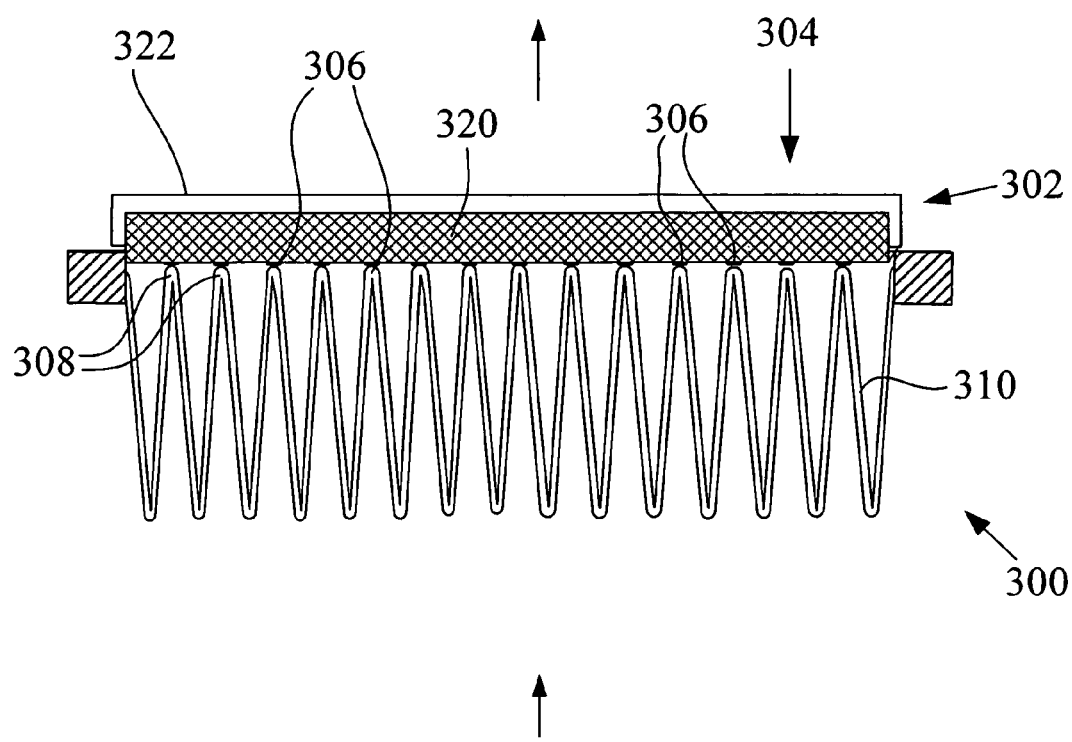
FIG. 3 is a schematic representation of a flow vortex suppression apparatus adhesively secured to the outlet side of an air filter, consistent with one aspect of the invention.

FIG. 3 is a schematic representation of a flow vortex suppression apparatus 302 advantageously adhesively secured to the outlet side 304 of an air filter 300 such that the air filter 300 incorporating the flow vortex suppression apparatus 302 can be sold, installed and replaced as a single component. The flow vortex suppression apparatus 302 includes an air flow permeable flow vortex dispersive media 320 extending across the outlet face of the filter media 310. The flow vortex suppression apparatus may be secured, for example, by hot melt or alternately by any known type of curing adhesive glue 306 applied to portions of the filter media that contact portions of the flow vortex suppression apparatus 302 so as to form an adhesive bond therebetween. In the case of pleated filter element 300 as illustrated in FIG. 3, the adhesive is advantageously applied at the outlet facing peaks 308 of the pleats of the filter media 310. In the case of an axial flow filter having alternately closed channels, the adhesive may be applied, for example, in spaced stripes across the outlet face of the filter element. The flow vortex suppression apparatus 302 may also be secured about its periphery to the frame or seal member 312 of the filter element, depending upon the type of filter element 300 to which the flow vortex suppression apparatus 302 is secured. In some aspects of the invention the flow vortex suppression apparatus 302 may optionally also include a supporting layer or member 322, for example a wire or plastic mesh component configured to provide support to the fleece against air flow induced forces induced on the air flow permeable flow vortex dispersive media 320. In some cases where the flow vortex suppression apparatus 302 is adhesively glued to portions of the air filter, the support member would not be required or provided.

Figure 4:
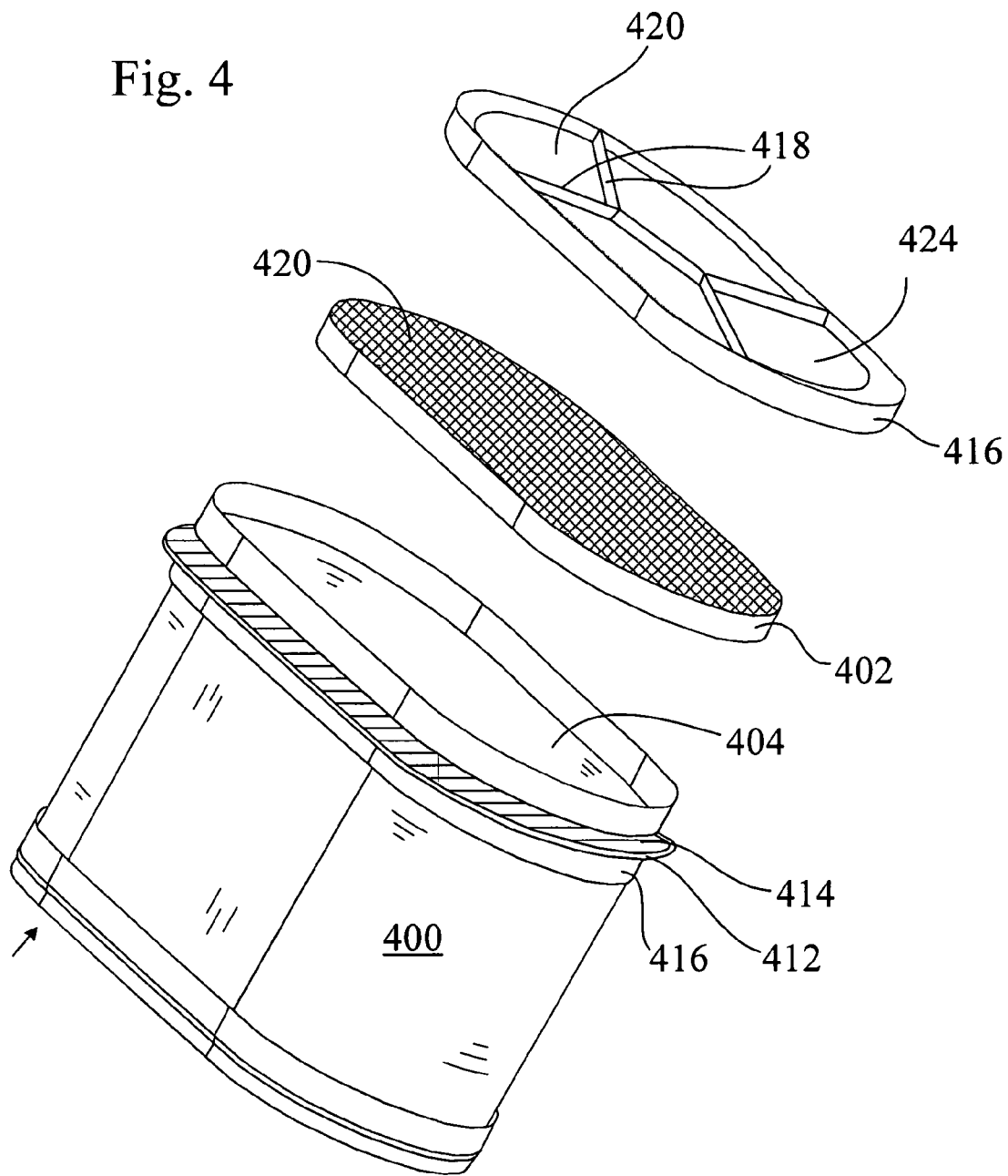
FIG. 4 is a schematic representation of a flow vortex suppression apparatus captively secured at the outlet face of an air filter by a filter seal ring, consistent with another aspect of the invention.

FIG. 4 is a schematic assembly representation of a flow vortex suppression apparatus 402 including an air flow permeable flow vortex dispersive media 420 (for example, a non-woven fleece material as discussed above). The flow vortex suppression apparatus 402 is captively secured onto the outlet face 404 of an air filter 400 by an annular frame member 416 inserted into and secured to the filter seal ring 414, consistent with another aspect of the invention. The filter seal ring 414 may include a resilient seal member 412 peripherally arranged to peripherally surround the seal ring 414 to provide a seal between the filter element 400 and the filter housing or air cleaner (shown schematically in FIG. 1). The frame member 416 may advantageously include one or more support arms 418 extending across the open space 424 at the interior of the frame member 416 configured and arranged to retain and support the flow vortex suppression apparatus 402 at its position proximate to the outlet face 404 of the filter element 400. The frame member 416 may optionally include a supporting layer or member, for example a wire or plastic mesh component configured to provide support to the fleece against air flow induced forces induced on the air flow permeable flow vortex dispersive media 420.

Figure 5:
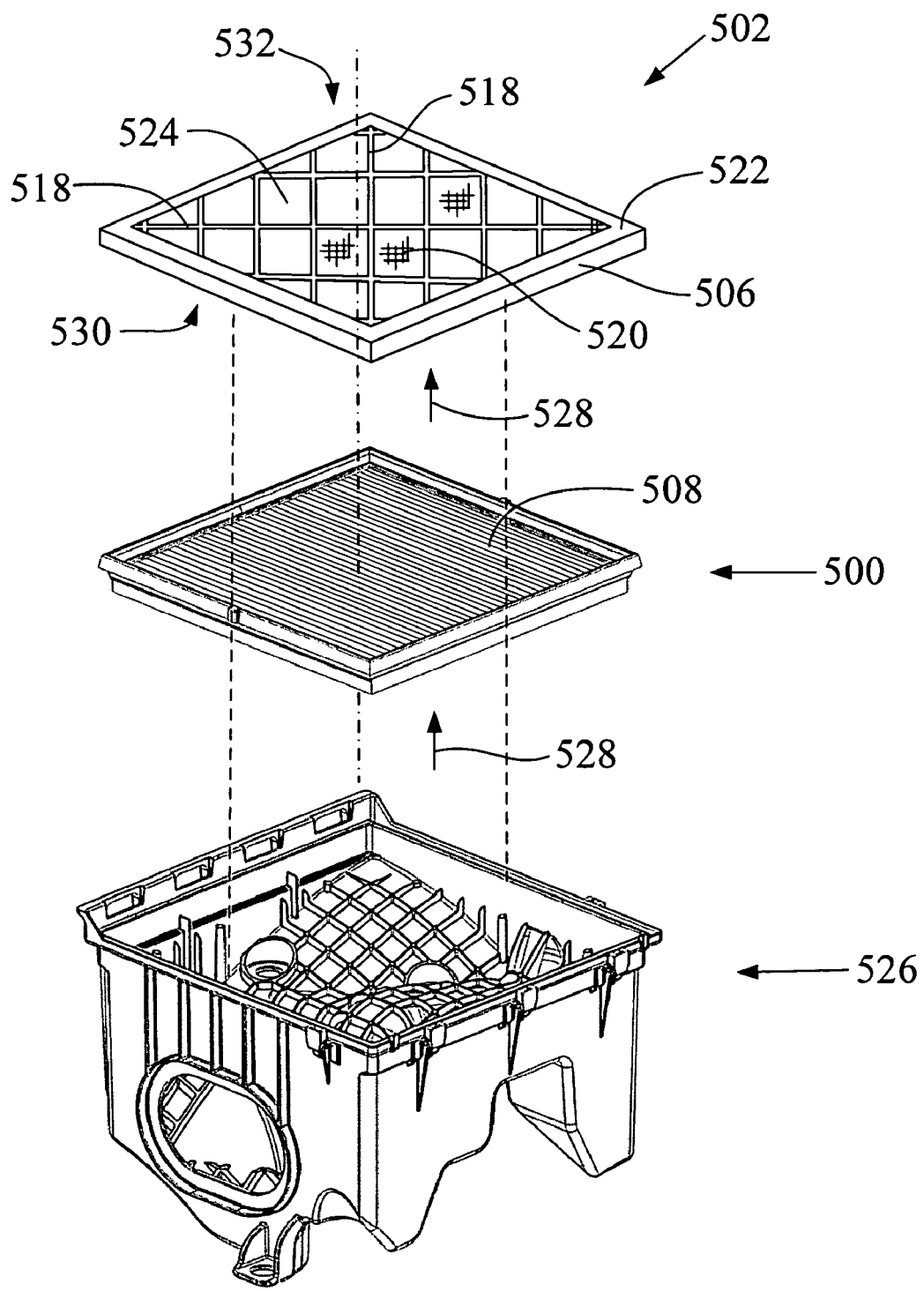
FIG. 5 is a schematic representation of a flow vortex suppression apparatus caged in an air flow permeable housing and incorporated into an air cleaner housing as a separate component, consistent with an additional aspect of the invention.

FIG. 5 is a schematic assembly diagram representation of a flow vortex suppression apparatus 502 caged in an air flow permeable housing 506 and configured for incorporation into an air cleaner housing 526 as a component separate from the air filter 500 and the housing 526. The air flow permeable housing 506 has an inlet face 530 and an outlet face 532. Air flows through the air cleaner housing 526 and filter element 500 in a direction generally indicated by arrow 528. The flow vortex suppression apparatus 502 is removably installed into the air cleaner housing and positioned to receive air flow from the clean air face 508 of the air filter element 500.

The air flow permeable housing 506 may advantageously include one or more support rails secured to the periphery frame of the air flow permeable housing 506 and extending across the open space 524 defined inside the periphery frame of the air flow permeable housing 506. The quantity and spacing of the support rails 518 may be selected according to provide sufficient support to the flow vortex suppression apparatus 502 to resist forces induced in the flow vortex suppression apparatus 502 due to the air flow through the apparatus 502.

The flow vortex suppression apparatus 502 may optionally include a supporting layer or member 522, for example a wire or plastic mesh component configured to provide support to the fleece against air flow induced forces induced on the air flow permeable flow vortex dispersive media 520. The support member 522 may be provided together with the support rails 518 or alternately instead of the support rails 518.

Advantageously as a separate component, the caged flow vortex suppression apparatus 502 may be retained between replacement intervals of the air filter 500, thereby reducing waste and repair part costs during air filter replacements. Additionally, in certain cases the caged flow vortex suppression apparatus 502 may be retrofit into an existing air cleaner 522, for example as an aftermarket accessory.

Figure 6:
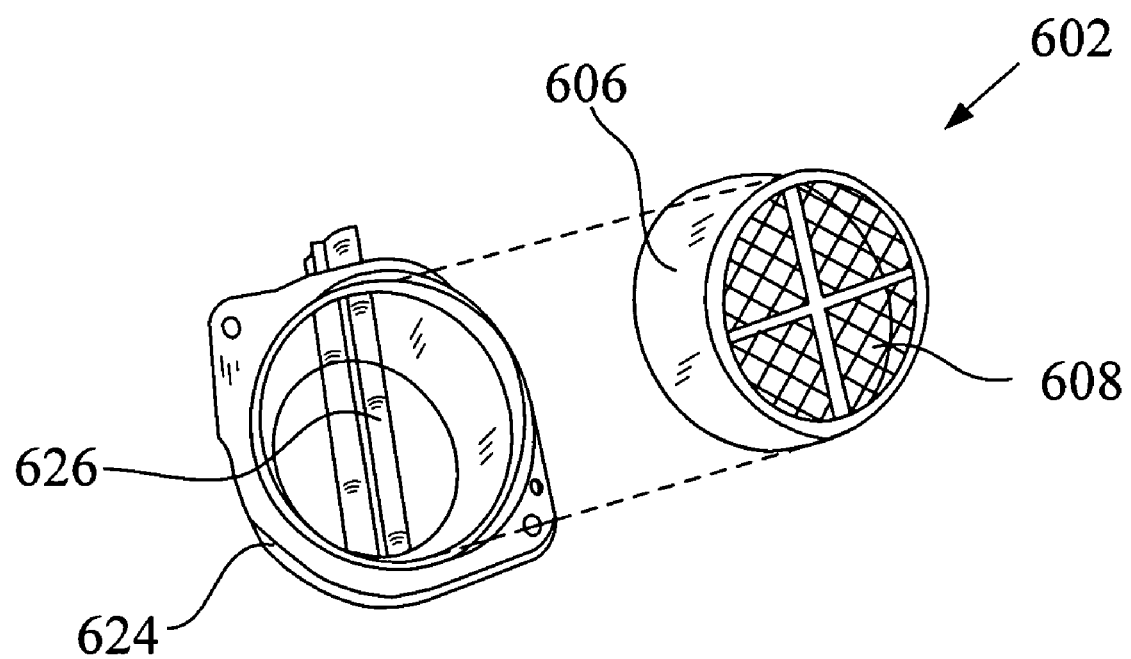
FIG. 6 is a schematic representation of a flow vortex suppression apparatus caged or installed upstream and insertable into the housing of a mass air flow sensor, consistent with a further aspect of the invention.

FIG. 6 is a schematic assembly representation of a flow vortex suppression apparatus 602 having an air flow permeable flow vortex dispersive media 608 caged in a housing 606. The housing 606 is sized and configured to enable installation of the flow vortex suppression apparatus 602 at least partially into the mass air flow sensor housing 624 in a position upstream of the mass air flow sensor 626. The housing 606 may be sized and configured to permit the flow vortex suppression apparatus 602 to be press fit into the mass air flow housing 624 such that it may later be dismounted from the mass air flow sensor housing 624 if replacement of the mass air flow sensor 626/housing 624 or the flow vortex suppression apparatus 602 is necessary.

The air flow permeable flow vortex dispersive media 608 is configured to constrain air flow reaching the mass air flow sensor 626 such that air flowing to the mass air flow sensor 626 must first pass through the flow vortex dispersive media 608 to advantageously diffuse vortices and reduce turbulence in the air stream, enabling improved mass air flow sensor 626 performance by reducing signal noise and signal variation. In addition to improving the performance of the mass air flow sensor 626, the flow vortex suppression apparatus 602 advantageously traps dirt or particulates present in the air intake tract into air flow permeable flow vortex dispersive media 608, thereby providing additional protection to the mass air flow sensor 626. Dirt and particulates in the air intake tract may include plastic flash arising from the manufacturing processes applied to various air intake tract components.

Flow Bench Test Results

A flow bench check was performed using an axial flow air filter equipped with a flow vortex suppression apparatus in a configuration as illustrated in FIG. 4. A mass air flow sensor was installed downstream of the air filter to simulate an engine air intake tract application.

Figure 7A:
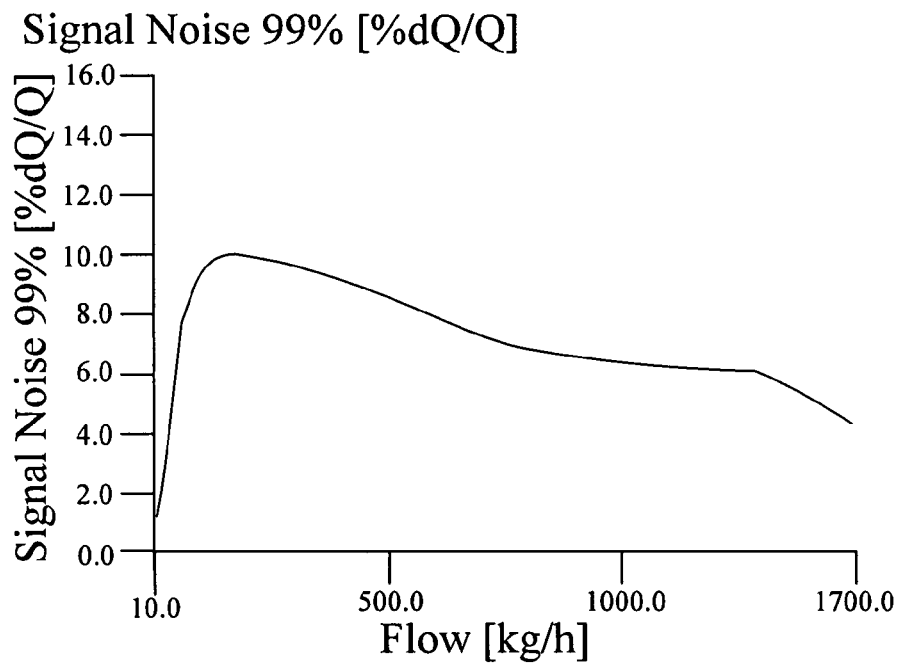
FIG. 7A is a graph of flow test bench results illustrating the measured signal noise in the flow measurement signal of the mass air flow sensor at various mass air flow rates when the air filter was installed without the flow vortex suppression apparatus of the present invention.

FIG. 7A is a graph illustrating the measured signal noise in the flow measurement signal of the mass air flow sensor at various mass air flow rates when the air filter was installed without the flow vortex suppression apparatus of the present invention.

Figure 7B:
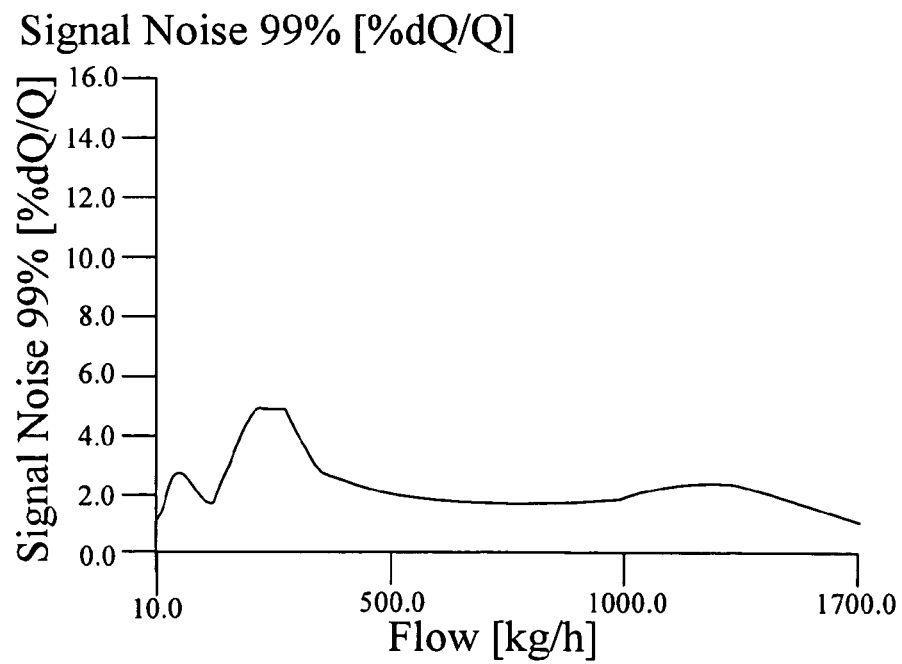
FIG. 7B is a graph of flow test bench results illustrating the measured signal noise in the flow measurement signal of the mass air flow sensor at various mass air flow rates when the air filter included the flow vortex suppression apparatus according to the present invention.

FIG. 7B is a graph illustrating the measured signal noise in the flow measurement signal of the mass air flow sensor at various mass air flow rates when the air filter included the flow vortex suppression apparatus according to the present invention.

As can be seen from the graphs, the flow vortex suppression apparatus of the present invention significantly reduces signal noise in the flow signal from the mass air flow sensor across virtually the full range of flow rates. This signal noise improvement is a result of the diffusion of flow vortices and reduced air flow turbulence as discussed earlier above.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A flow vortex suppression apparatus comprising:
   a motor vehicle air cleaner housing arranged in a motor vehicle engine air intake duct, said air cleaner housing including a filter element;
   a mass air flow sensor arranged downstream of said filter element in said air intake duct;
   an air flow permeable fibrous vortex dispersive media installed in said air duct in a position upstream of said mass flow sensor and configured to occlude said engine air intake duct such that air flow in said duct must pass through said vortex dispersive media;
   wherein said vortex dispersive media is configured and adapted to diffuse vortices and reduce air turbulence of an air stream entering said mass flow sensor, reducing variations and noise in a flow measurement signal from said mass air flow sensor.

2. The flow vortex suppression apparatus of claim 1, further including
   a supportive cage housing configured to receive and contain said vortex dispersive media therein,
   said cage housing having air flow permeable inlet and outlet faces;
   said cage housing arranged in said air duct upstream of said mass air flow sensor.

3. The flow vortex suppression apparatus of claim 2, wherein said cage housing is configured to removeably install into said air cleaner housing and positioned to receive air flow from a clean air face of said air filter element.

4. The flow vortex suppression apparatus of claim 3, wherein
said cage housing inlet face has substantially the same dimensions as said clean air face; and
wherein said cage housing is installable into said air cleaner in a position proximate to said clean air face.

5. The flow vortex suppression apparatus of claim 1, wherein said fibrous vortex dispersive media comprises a non-woven fleece of spun or melt blown natural and/or synthetic fibers of materials including any of nylon, polypropylene, glass fibers and synthetic resin microfibers.

6. The flow vortex suppression apparatus of claim 1, wherein said fibrous vortex dispersive media is operable to entrap at least a portion of particulate contaminants present in said air flow, further protecting said mass air flow sensor.

7. The flow vortex suppression apparatus of claim 1, wherein said vortex suppression apparatus is operable to dampen noise levels transmitted through said air intake duct.

8. The flow vortex suppression apparatus of claim 1, wherein said flow vortex suppression apparatus further comprises a supporting member including a wire mesh or plastic mesh configured to provide support to the air flow permeable fibrous vortex dispersive media against air flow induced forces.

9. A flow vortex suppression apparatus comprising:
a motor vehicle engine air intake duct;
a motor vehicle engine air intake mass air flow sensor;
a housing arranged in said air intake duct, said mass air flow sensor arranged to send air flow with said housing;
an air flow permeable fibrous vortex dispersive media provided at an air inlet side of said housing, said flow vortex suppression apparatus configured to constrain said air flow to pass through said fibrous vortex dispersive media before reaching said air flow sensor;
wherein said vortex dispersive media is configured to diffuse vortices and reduce air flow turbulence entering said mass flow sensor, reducing variations and noise in a flow signal from said sensor.

10. The flow vortex suppression apparatus of claim 9, wherein said fibrous vortex dispersive media comprises a non-woven fleece.

11. A flow vortex suppression element, comprising:
a motor vehicle engine air intake duct;
a motor vehicle air cleaner housing arranged in a motor vehicle engine air intake duct, said air cleaner housing including a filter element;
a motor vehicle engine air intake mass air flow sensor arranged in said air intake duct downstream of said air filter having an inlet and an outlet face;
a mass air flow sensor housing arranged in said air intake duct, said mass air flow sensor arranged to sense air flowing through said mass air flow sensor housing;
an air flow permeable fibrous vortex dispersive media positioned at said outlet face of said air filter and configured to fully cover said outlet face such that air flow through said air filter must pass through said vortex dispersive media;
wherein said vortex dispersive media is operative to reduce turbulence and diffuse vortices of said air flow passing therethrough.

12. The flow vortex suppression element of claim 11, wherein said fibrous vortex dispersive media comprises a non-woven fleece.

13. The flow vortex suppression element of claim 12, wherein said vortex dispersive media is adhesively secured to said outlet face.

14. The flow vortex suppression element of claim 12, wherein said flow vortex suppression element further comprises a supporting member including a wire mesh or plastic mesh configured to provide support to the air flow permeable fibrous vortex dispersive media against air flow induced forces.

15. The flow vortex suppression element of claim 12, wherein said vortex dispersive media is retentively captured against said outlet face by a frame member secured to a filter seal ring.

16. The flow vortex suppression element of claim 12, wherein said flow vortex suppression element further comprises a supporting member including a wire mesh or plastic mesh configured to provide support to the air flow permeable fibrous vortex dispersive media against air flow induced forces.

* * * * *